United States Patent
Watson

(10) Patent No.: US 7,505,221 B2
(45) Date of Patent: Mar. 17, 2009

(54) MULTIPLE SECTION READ/WRITE HEAD

(75) Inventor: Mark L. Watson, Louisville, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 179 days.

(21) Appl. No.: 11/648,989

(22) Filed: Jan. 3, 2007

(65) Prior Publication Data
US 2008/0158720 A1 Jul. 3, 2008

(51) Int. Cl.
G11B 5/09 (2006.01)
G11B 5/265 (2006.01)
G11B 5/584 (2006.01)

(52) U.S. Cl. .................. 360/53; 360/121; 360/129
(58) Field of Classification Search ............. None
See application file for complete search history.

(56) References Cited

U.S. PATENT DOCUMENTS

| 6,304,400 | B1 | 10/2001 | Schneider |
| 6,970,314 | B2 | 11/2005 | Watson et al. |
| 7,054,093 | B1 | 5/2006 | Anderson et al. |
| 7,239,465 | B1* | 7/2007 | Watson et al. ........... 360/55 |
| 2005/0122623 | A1 | 6/2005 | Dee |

* cited by examiner

Primary Examiner—Jason Olson
(74) Attorney, Agent, or Firm—Brooks Kushman P.C.

(57) ABSTRACT

Data tracks are written across a width of a tape by positioning a first head section across the tape and writing a first subset of data tracks onto the tape with a first plurality of write elements on the first head section. A second head section is positioned across the tape separately from the first head. A second subset of data tracks is written onto the tape with a second plurality of write elements on the second head section so that the second subset is interleaved with the first subset. A third head section is positioned across the tape separately from the first head and the second head. The first subset and second subsets are read with a plurality of read elements on the third head section to verify that data was correctly written onto the tape.

20 Claims, 7 Drawing Sheets

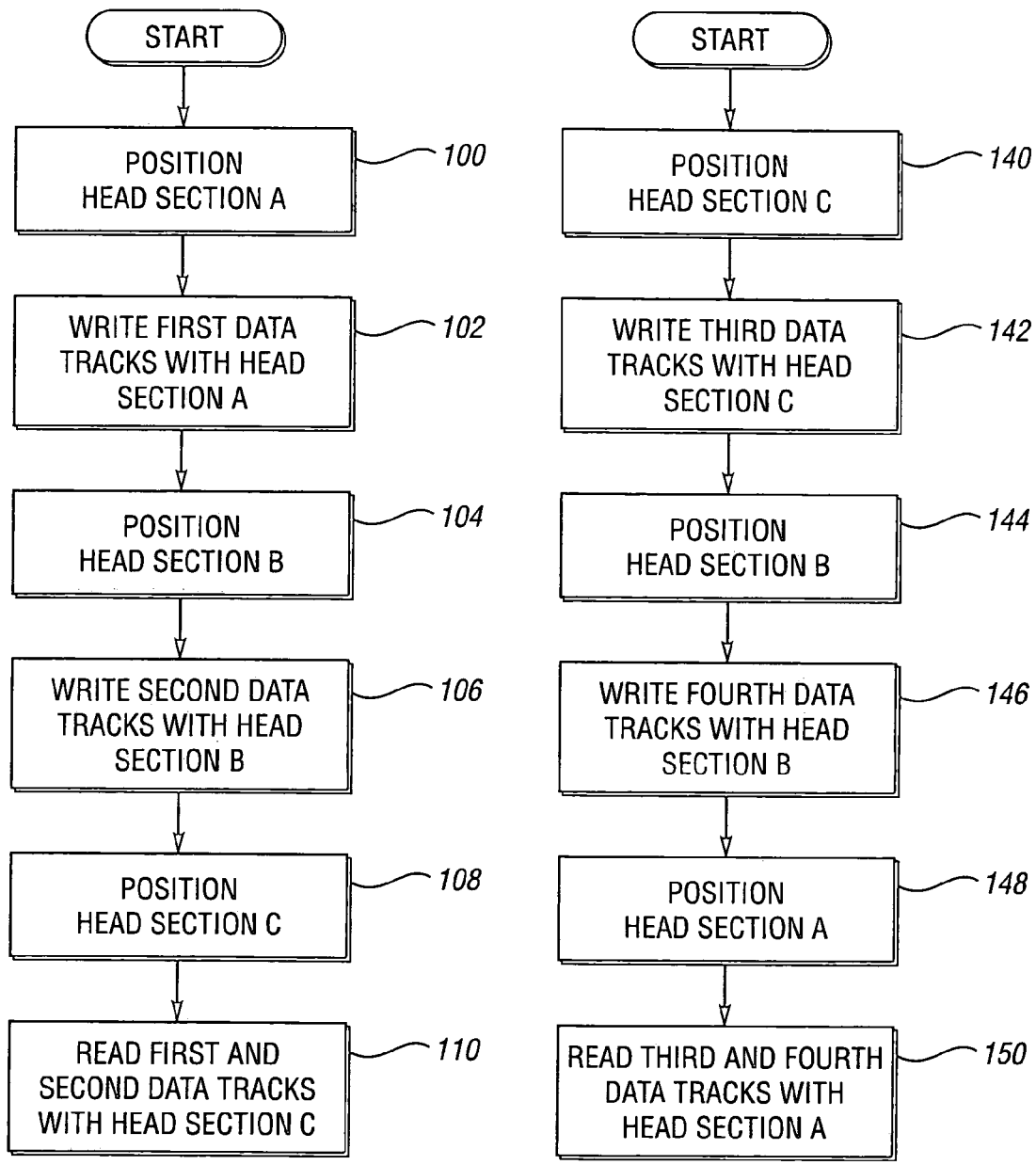

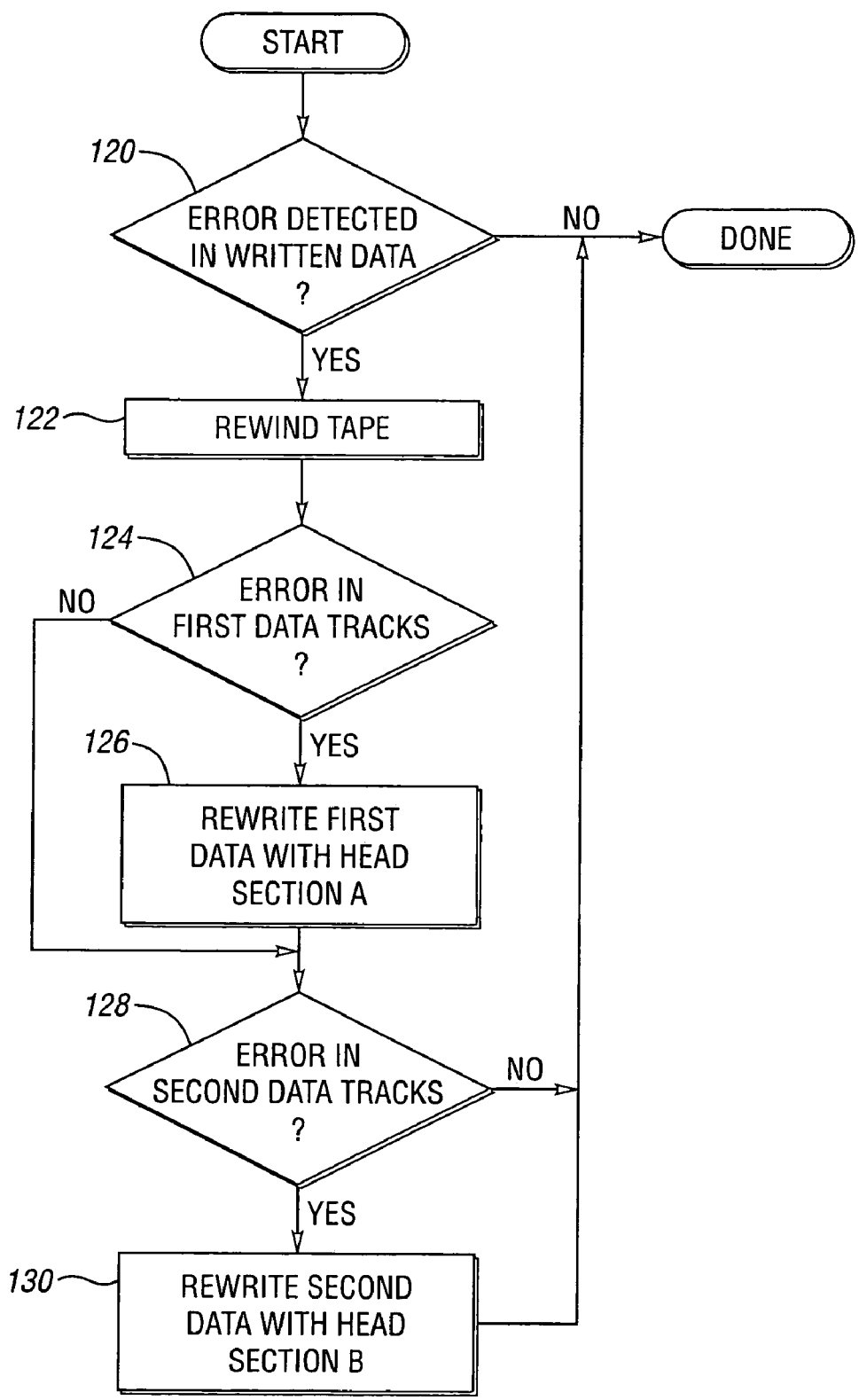

MULTIPLE SECTION READ/WRITE HEAD

BACKGROUND OF THE INVENTION

1. Field of the Invention

The present invention relates to writing data onto and reading data from tape.

2. Background Art

Data is written onto tape for long term storage. In order to increase efficiency and stay competitive, makers of tape systems strive to increase data rates and tape storage capacities. The increase in storage capacity can be achieved by increasing both the linear data density and also the number of data tracks written across the width of the tape. However, as the track density is increased, systems which continue to utilize current head designs inevitably become limited by a number of fundamental dimensional constraints. One major issue is the finite dimensional stability of tape media. Due to pack compression, temperature, humidity, and the like, the tape width changes over time and with use.

Competitive data tape systems often use multiple read/write channels operating in parallel. This requires that tape storage system recording heads are constructed with multiple, independent, read-write structures which are laid out on a head substrate with a constant channel pitch between the structures. As tape width varies, the position of data tracks written on the tape changes relative to the position of the read and write elements fixed on the head. This may result in previously recorded data tracks becoming increasingly laterally displaced relative to the outer read-write elements on the head. In the limit of excessive dimensional changes, channels accessing read elements on the outer sides of the head are no longer able to read previously recorded data. This problem becomes increasingly important for very small track pitches expected in future tape drives. This problem also becomes worse as tape is made thinner due to the need to put increasing amounts of data within the given volume of a tape cartridge.

Typically, dimensional changes are mitigated by controlling, insofar as possible, the tape dimensional stability and by writing wide tracks which are read back using narrow data readers (i.e., "write wide-read narrow"). However, as the track density is increased in future products, such an approach will become increasingly problematic. This is due in part to the fact that the recording head read and write structures have a finite size (i.e., lateral width) largely determined by the photolithographic capability of tools used to define the write element coils and the requirement that the electric resistance of the coils is reduced as much as possible. In addition, reducing the physical separation of the write elements for adjacent tracks can also result in electrical coupling between the write elements which can result in corruption and loss of the written data. This is increasingly likely at the very signal high signal frequencies at which future drives will operate.

Although the tape dimensional stability of existing base film materials can potentially be improved, or other base film materials with improved dimensional stability used, this will significantly increase the cost of the tape with attendant reduced competitiveness when compared with other storage technologies.

SUMMARY OF THE INVENTION

Various embodiments provide independently servoed head sections for writing data tracks onto tape. Data tracks are written by more than one head section and then read by yet a different head section. In some embodiments, when tape direction is reversed, a different combination of the head sections writes the data tracks. Write elements may be arranged on different head sections to minimize the pitch between adjacent data tracks.

The foregoing objects and other objects, features, and advantages of the various embodiments will be readily apparent upon consideration of the following detailed description in conjunction with the accompanying drawings.

BRIEF DESCRIPTION OF THE DRAWINGS

FIG. 6 is a flow diagram illustrating writing according to an embodiment;

FIG. 7 is a flow diagram illustrating rewriting according to an embodiment; and

FIG. 8 is a flow diagram illustrating writing according to an embodiment.

DETAILED DESCRIPTION OF THE PREFERRED EMBODIMENT(S)

Figure 1:
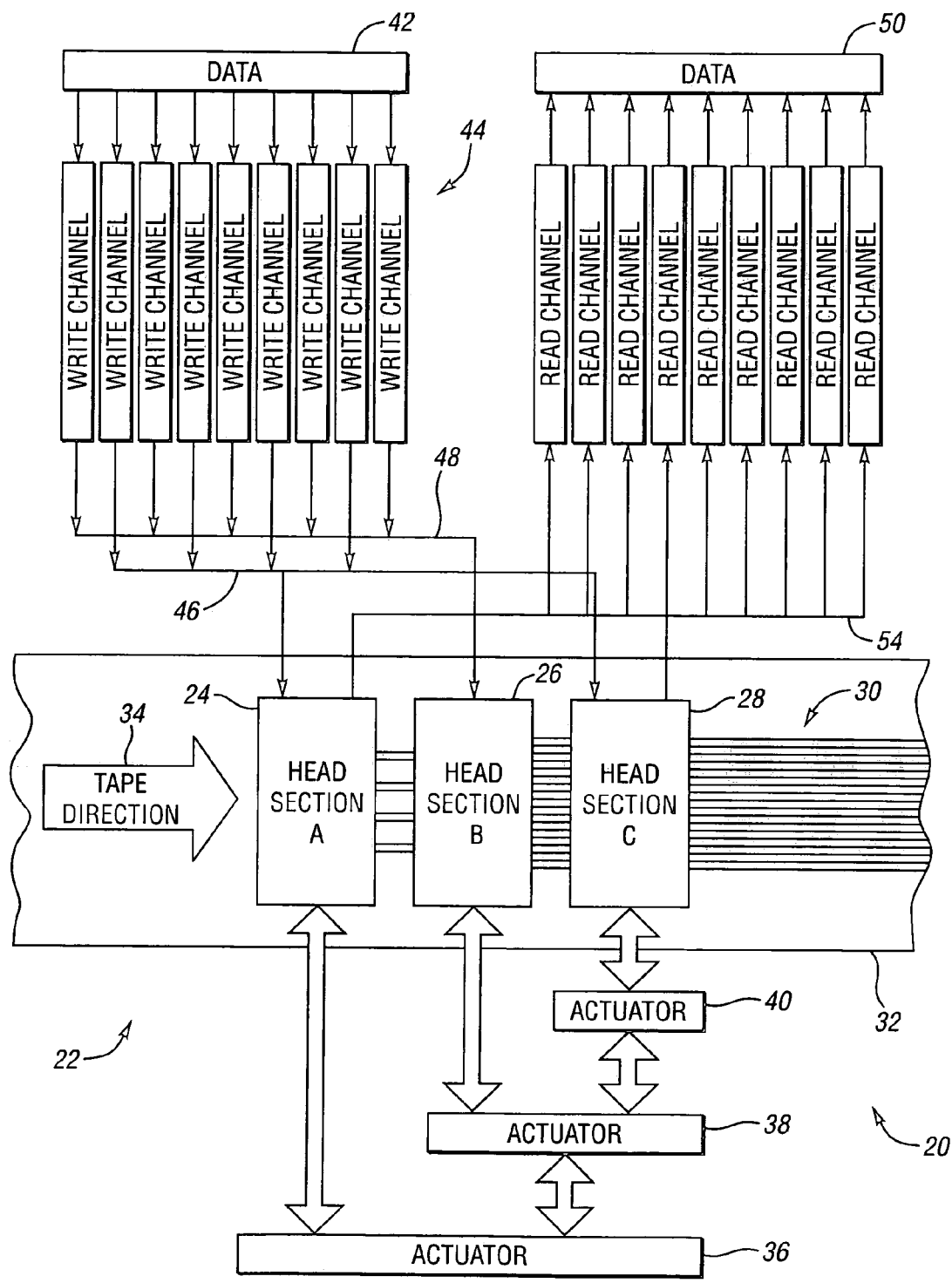
FIG. 1 is a schematic drawing illustrating a data storage system according to an embodiment.

Referring to FIG. 1, a schematic drawing illustrating a data storage system according to an embodiment is shown. A data storage system, shown generally by 20, includes a tape head, shown generally by 22. Tape head 22 includes separate head section "A" 24, head section "B" 26, and head section "C" 28. Tape head 22 writes a plurality of data tracks, shown generally by 30, onto tape 32 as tape 32 moves in tape direction 34 past tape head 22.

Head sections 24, 26, 28 can be positioned across the width of tape 32 independently of each other through the use of a plurality of actuators. In the embodiment shown, actuator 36 positions head section "A" and actuator 38. Actuator 38 positions head section "B" and actuator 40. Actuator 40 positions head section "C". Actuators 36, 38, 40 for positioning tape head sections may be constructed by any means known in the art such as, for example, electric motors driving various linkages, voice coil motors, piezoelectric motors, and the like. In a preferred embodiment, each head section 24, 26, 28 has its own fine adjustment actuator, such as a voice coil motor. The entire head assembly 22 is coarsely positioned using a coarse actuator such as, for example, a rotating electrical motor driving a screw shaft, a voice coil motor with a large travel, a cantilevered arm, and the like.

Data 42 to be written onto tape 32 is received by a plurality of write channels, indicated by 44, for processing data 42 in parallel. Write channels 44 each may include electronics for processing data 42 including encoders, digital-to-analog converters, pulse generators, write equalizers, write drivers, and the like, as is known in the art. First write connections 46 interconnect a subset of write channels 44 with head section "A" and head section "C". As will be described in greater detail below, either head section "A" or head section "C" writes data onto tape 32 depending upon the direction of movement of tape 32 past tape head 22. Second write connections 48 interconnect a separate subset of write channels 44 with head section "B". Data 50 read from tape 32 is first processed by a plurality of read channels 52. Each of read channels 52 may include a preamp, read equalizer, analog-to-digital converter, dropout compensator, decoder, and the like, as is known in the art. Read connections 54 interconnect read channels 52 with head section "A" and head section "C". Preferably, data is read from either head section "A" or head section "C" depending upon the direction of travel of tape 32 past head 22.

The embodiment illustrated in FIG. 1 used common write channels for head sections 24, 28 and common read channels for head sections 24, 28. As will be recognized by one of ordinary skill in the art, each head section may have its own dedicated write channels and/or read channels.

Figure 2:
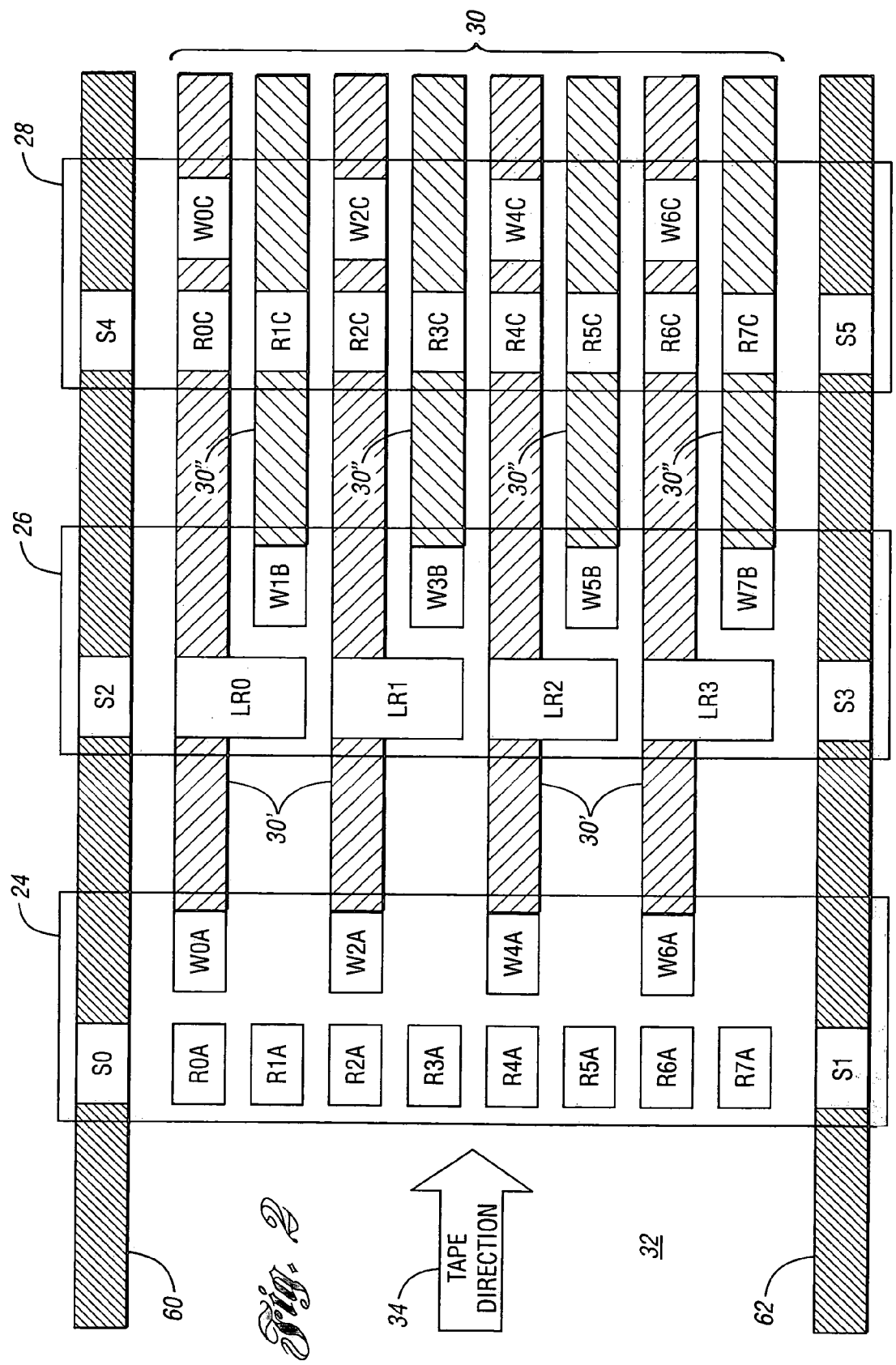
FIG. 2 is a schematic diagram illustrating writing data tracks in a first tape direction according to an embodiment.

Referring now to FIG. 2, a schematic diagram illustrating writing data tracks in a first tape direction according to an embodiment is shown. In this embodiment, eight narrow data tracks 30 are written onto and then read from tape 32. Head section "A" 24 includes eight read elements R0A, R1A, . . . , R7A. Head section 24 also includes four write elements W0A, W2A, W4A, and W6A, for writing even numbered data tracks 30. Likewise, head section "C" 28 includes eight read elements R0C, R1C, . . . , R7C for reading data from data tracks 30. Head section 28 also includes four write elements W0C, W2C, W4C, and W6C for writing even numbered data tracks 30. Head section "B" 26 includes four write elements W1B, W3B, W5B, and W7B, for writing odd numbered data tracks 30.

FIG. 2 illustrates tape 32 moving in tape direction 34 so that a portion of tape 32 passes first by head section "A" 24, then head section "B" 26, and finally head section "C" 28. As tape 32 passes under head section 24, write elements W0A, W2A, W4A, and W6A write first set of data tracks 30' onto tape 32. As tape 32 passes head section 26, write elements W1B, W3B, W5B, and W7B write second set of data tracks 30" onto tape 32. Data tracks 30, including tracks 30' and tracks 30", are read by read elements R0C-R7C on trailing head section 28. This read-after-write function is used to verify that data was correctly written into data tracks 30. During this write operation, read elements R0A-R7A in head section 24 and write elements W0C, W2C, W4C, W6C in head section 28 are not used.

Tape 32 may include one or more servo tracks 60, 62 typically pre-written onto tape 32. Each head section 24, 26, 28 includes one or more servo read elements for reading servo tracks 60, 62. In the embodiment shown, head section "A" 24 includes servo read element S0 for reading servo track 60 and servo read element S1 for reading servo track 62. Head section "B" 26 includes servo read element S2 for reading servo track 60 and servo read element S3 for reading servo track 62. Head section "C" 28 includes servo read element S4 for reading servo track 60 and servo read element S5 for reading servo track 62. Servo read elements S0 through S5 generate servo signals used in a closed loop controller, not shown for clarity, used to position head sections 24, 26, 28 across the width of tape 32. The design and implementation of such a servo system is well known in the art.

Figure 3:
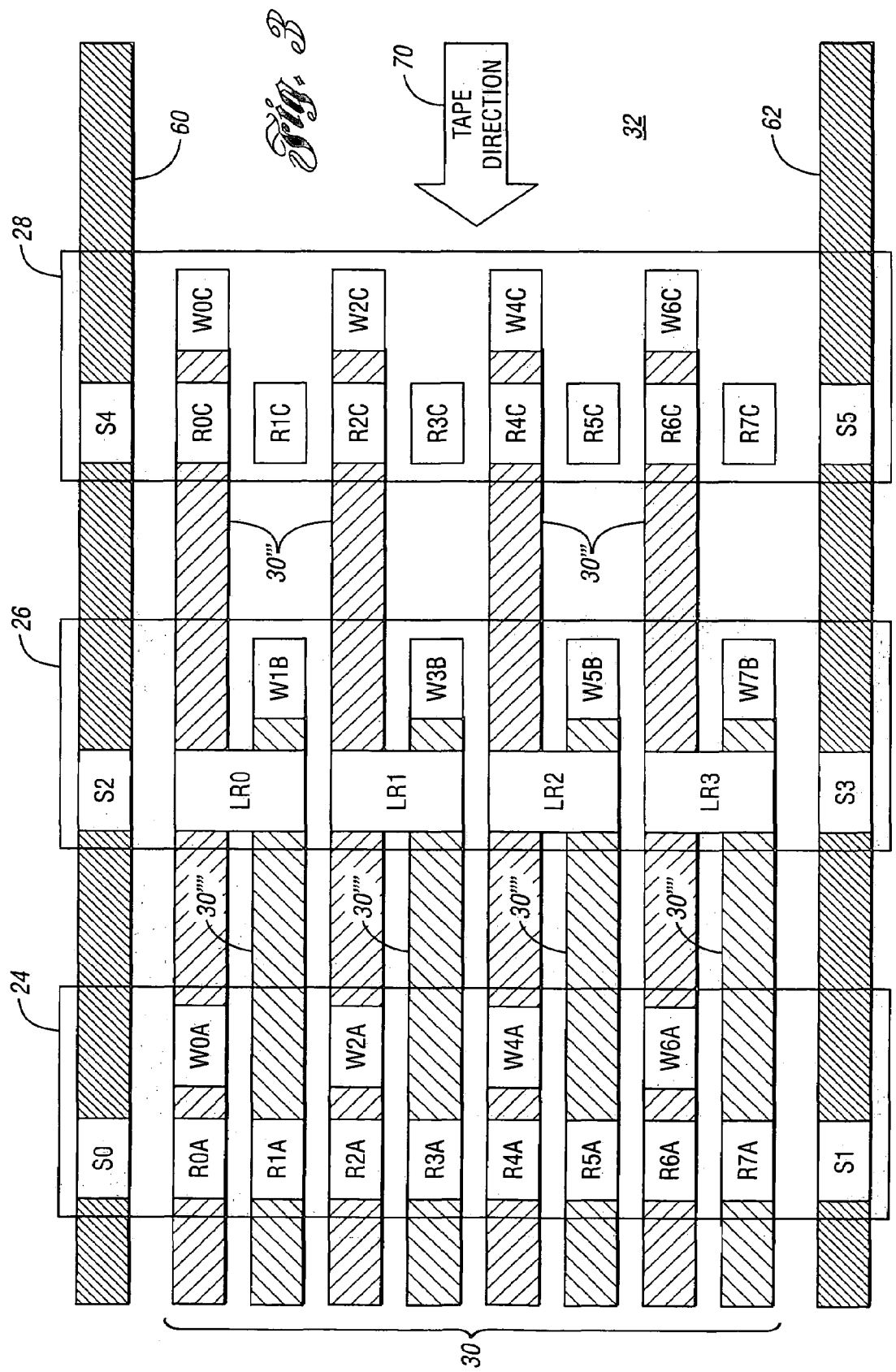
FIG. 3 is a schematic diagram illustrating writing data tracks in a second tape direction according to an embodiment.

Referring now to FIG. 3, a schematic diagram illustrating writing data tracks in a second tape direction according to an embodiment is shown. Additional data tracks 30 may be written along tape 32 in the opposite tape direction 70. Typically, tape 32 is written in first tape direction 34 along the length of tape 32 until the end of tape 32. Head sections 24, 26, 28 are then repositioned to a different location across the width of tape 32 and the direction of tape travel is reversed. In this example, a section of tape 32 first passes under head section "C" 28, then under head section "B" 26, and finally under head section "A" 24. Write elements W0C, W2C, W4C, and W6C in head section 28 write first data tracks 30'" onto tape 32. Head section 26 then writes second set of data tracks 30"" using write elements W1B, W3B, W5B, and W7B. Data tracks 30, including tracks 30'" and 30"" are read by read elements R0A-R7A on trailing head section 24. This read-after-write function verifies that the data has been correctly written into data tracks 30. During this write operation, read elements R0C-R7C in head section 28 and write elements W0A, W2A, W4A, W6A in head section 24 are not used.

Typical prior art commercial read/write heads include the same number of read elements as write elements joined together in a head module. Typical configurations include read/write/read modules and read/write-write/read modules. These modules require very precise alignment between each write element and the corresponding read element to allow read-after-write functionality. Some embodiments of the present invention eliminate this problem by separately positioning the head section performing the read-after-write operation. In addition, spacing the active read elements from the active write elements along the direction of tape travel in separate head sections significantly reduces the pick-up of unwanted signals in the read elements from the high frequency, high current write signals flowing to the write elements. Yet another benefit of some embodiments is a reduction in the number of conductors provided to each head section. The collection of conductors, referred to as a flex, interconnects each head section with electronics in write channels 44 and read channels 52. By eliminating the need for certain write elements or read elements in each head section, the number of conductors in the interconnecting flex is reduced, simplifying routing and head section movement.

Another advantage of some embodiments is that the physical separation between write elements can be doubled on each head section relative to the actual written track pitch on tape 32, thereby significantly mitigating electrical coupling between write elements. In addition, greater space is provided for forming write elements in each head section.

Some embodiments enable the channel (device) pitch to be very substantially reduced. In prior systems, there was a natural limit to the track density possible in tape storage determined by the intrinsic dimensional stability of the media. This natural limit is exceeded in various embodiments by locating write elements on two or more separately servoed head sections.

Yet another advantage of some embodiments is the possibility to design the tape contact surface of each head section in such a fashion that the total contact area between the head and media is reduced compared with existing head designs. This improves media and head wear and reduces the propensity for adhesion (i.e., "stiction") between the head and the tape. This is particularly important for the extremely smooth tape media predicted to be used in the future.

The illustrations in each of FIGS. 2 and 3 show eight data tracks 30 with half written by one head section interleaved with half written by a different head section. As will be recognized by one of ordinary skill in the art, many variations are possible. For example, more or less than eight data tracks may be written. In addition, other interleaved patterns for data tracks 30 may be written. Moreover, more than two head sections may be used to write data tracks 20.

Figure 4:
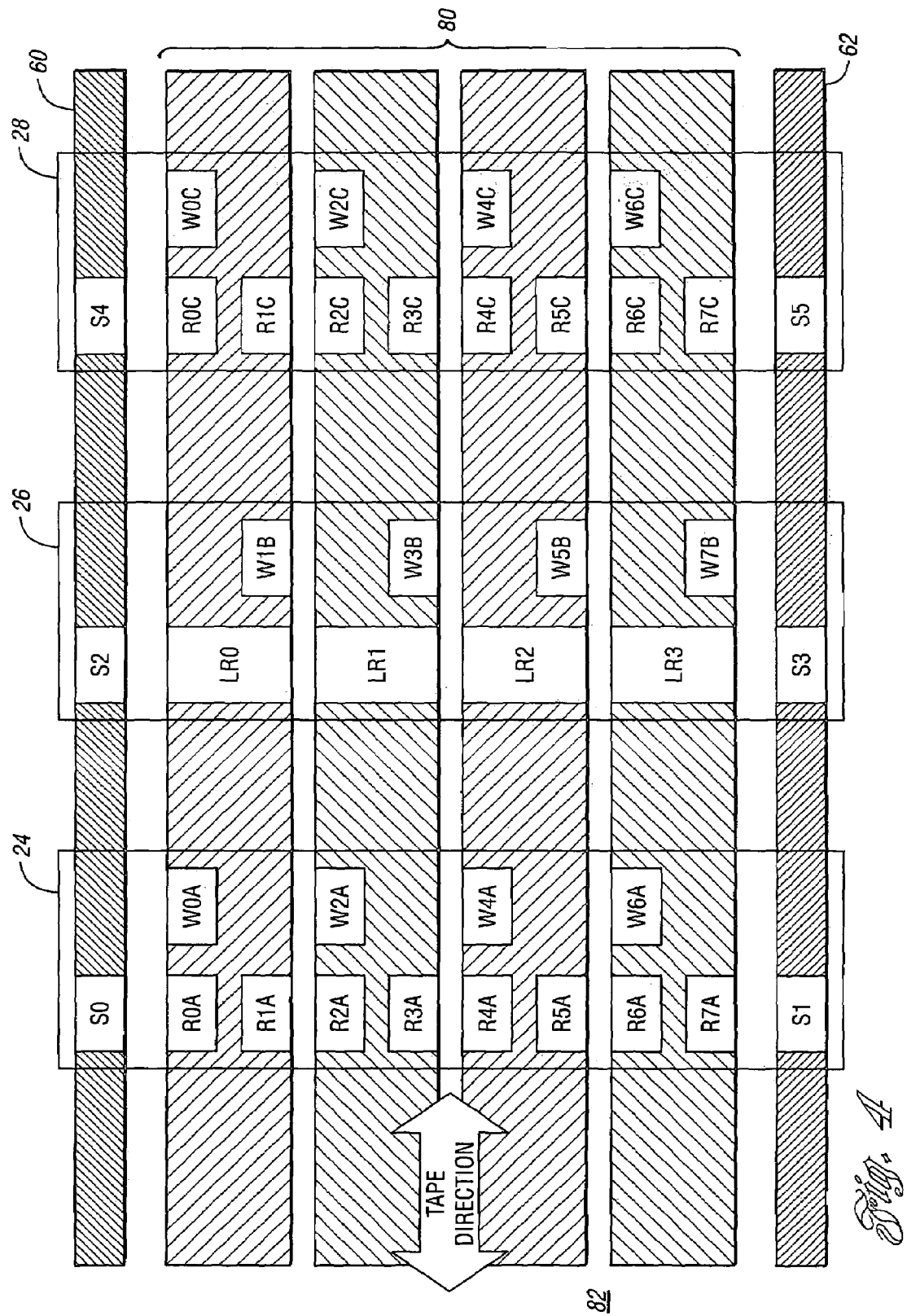
FIG. 4 is a schematic diagram illustrating reading legacy data tracks according to an embodiment.

Referring now to FIG. 4, a schematic diagram illustrating reading legacy data tracks according to an embodiment is shown. Yet another advantage of some embodiments is the ability to read tapes written by a previous generation of tape drives writing wider data tracks. Head section "B" 26 does not require read elements for accessing narrow data tracks as described with regards to FIGS. 2 and 3 above. Therefore, legacy read elements LR0-LR3 may be included on head section 26. Legacy read elements LR0-LR3 are wider than write elements used to write narrow data tracks or read elements used to read those narrow data tracks. Legacy read elements LR0-LR3 can therefore be used to read wide data tracks 80 from legacy tape 82.

The channel (device) pitch of the legacy readers can be much wider than the channel (device) pitch of the read elements on the other head sections. For example, these readers may be intended to read a legacy tape in which data tracks have been written sufficiently wide that dimensional stability is not an issue.

Figure 5:
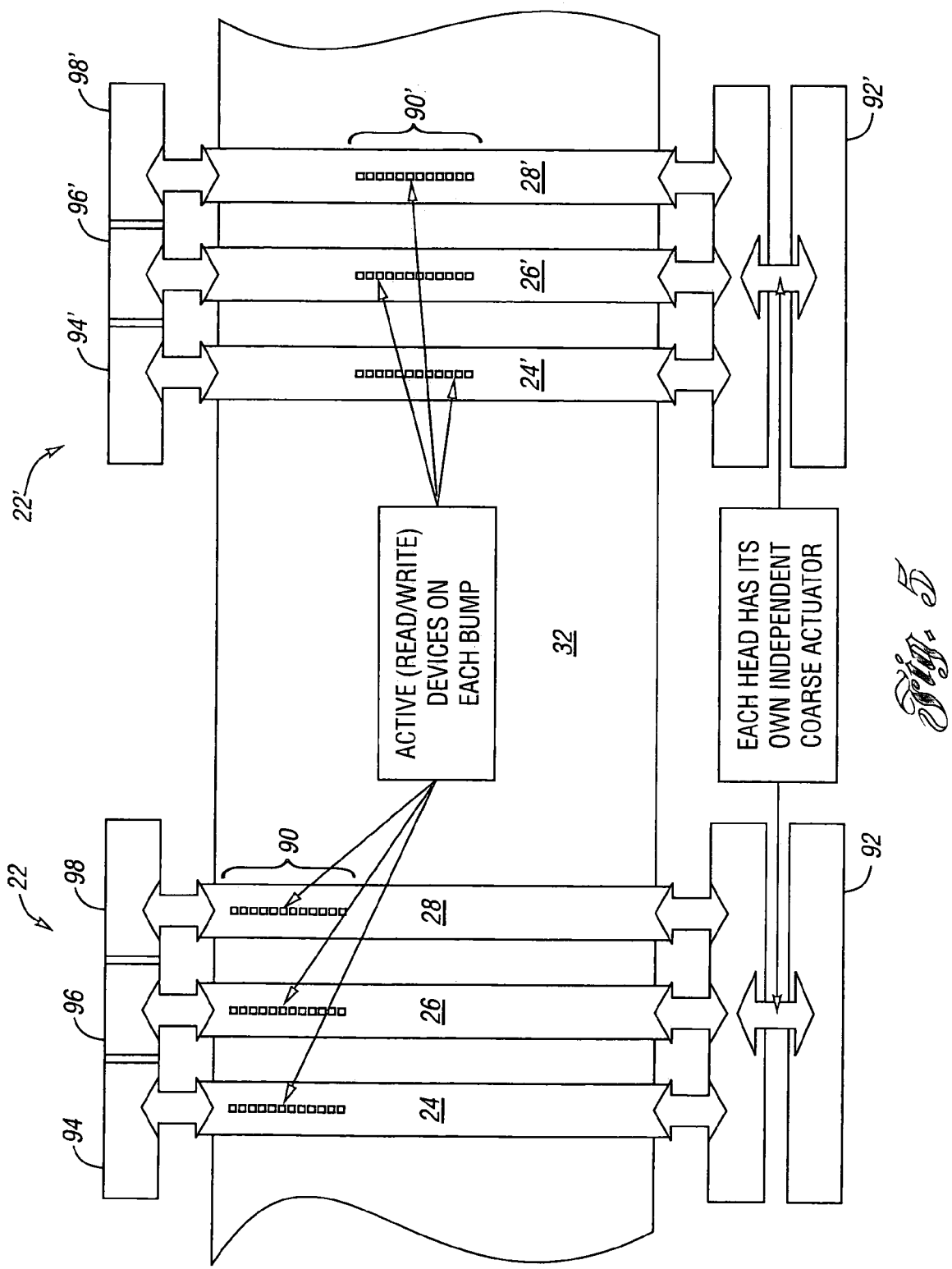
FIG. 5 is a schematic diagram illustrating multiple tape heads according to an embodiment.

Referring now to FIG. 5, a schematic diagram illustrating multiple tape heads according to an embodiment is shown. Tape head 22 and tape head 22' operate in a similar manner for writing data tracks onto tape 32. Tape head 22 has active elements 90, including write elements and read elements as described above, located in a different position across the width of tape 32 from active elements 90', including write elements and read elements as described above, for tape head 22'. Tape head 22 includes coarse actuator 92 for coarse positioning of head sections 24, 26, 28 across the width of tape 32. Tape head 22 also includes fine actuator 94 for fine positioning of head section 24, fine actuator 96 for fine positioning of head section 26, and fine actuator 98 for fine positioning of head section 28 across the width of tape 32. Similarly, tape head 22' includes coarse actuator 96' and fine actuators 94', 96', and 98'.

Referring now to FIGS. 6-8, flow diagrams illustrating various embodiments are shown. As will be appreciated by one of ordinary skill in the art, the operations illustrated are not necessarily sequential operations. The order of steps may be modified within the spirit and scope of the present invention and the order shown here is for logical presentation. Also, methods illustrated may be implemented by any combination of hardware, software, firmware, and the like, at one location or distributed. The present invention transcends any particular implementation and the embodiments are shown in sequential flow chart form for ease of illustration.

Referring now to FIG. 6, a flow diagram illustrating writing according to an embodiment is shown. Head section A is positioned across the width of the tape, as in block 100. First data tracks are written onto the tape with head section A, as in block 102. Head section B is positioned across the width of the tape, as in block 104, separately from the positioning of head section A. Second data tracks are written with head section B, as in block 106. Head section C is positioned across the width of the tape, as in block 108, separately from the positioning of head sections A and B. First and second data tracks are read with head section C, as in block 110.

Referring now to FIG. 7, a flow diagram illustrating rewriting data according to an embodiment is shown. A determination is made as to whether an error was detected in written data as in block 120. Preferably, this error checking is based on the first and second data tracks read with head section C as described in FIG. 6. If an error is detected, the tape is rewound, as in block 122. A check is made to determine if the error occurred in the first data tracks, as in block 124. If so, first data is rewritten with head section A. Similarly, a check is made to determine if the error occurred in second data tracks, as in block 128. If so, second data is rewritten with head section B, as in block 130. In this way, only the head section necessary to correct data errors need be used in the rewrite operation.

Referring now to FIG. 8, a flow diagram illustrating writing according to an embodiment is shown. Head section C is positioned, as in block 140. Third data tracks are written onto the tape with head section C, as in block 142. Head section B is independently positioned, as in block 144. Fourth data tracks are written with head section B, as in block 146. Head section A is independently positioned, as in block 148. Third and fourth data tracks are read with head section A, as in block 150. Once again, this read-after-write operation may be used to determine if an error occurred when writing third data tracks and fourth data tracks. The error processing routine of FIG. 7 is readily adapted to writing While embodiments of the invention have been illustrated and described, it is not intended that these embodiments illustrate and describe all possible forms of the invention. For example, words or designations such as first, second, and third, or "A", "B", and "C", or W1, W2, W3 are not meant to convey any particular order or sequence. Rather, the words used in the specification are words of description rather than limitation, and it is understood that various changes may be made without departing from the spirit and scope of the invention.

What is claimed is:

1. A data storage system for writing data onto a tape, the tape having a width, the data storage system comprising:
   a first head section having a first plurality of write elements and a first plurality of read elements, the first plurality of write elements operative to simultaneously write a first plurality of data tracks onto the tape, the first plurality of read elements operative to simultaneously read a second plurality of data tracks from the tape;
   a second head section having second plurality of write elements and a second plurality of read elements, the second plurality of write elements operative to simultaneously write the first plurality of data tracks onto the tape, the second plurality of read elements operative to simultaneously read the second plurality of data tracks from the tape, the second head section positioned across the tape width separately from the position of the first head section across the tape width; and
   a third head section having a third plurality of write elements, the third plurality of write elements operative to simultaneously write a third plurality of data tracks onto the tape different from the first plurality of data tracks, the third head section positioned across the tape width separately from the position of the first head section and the second head section across the tape width.

2. The data storage system of claim 1 wherein the second plurality of data tracks comprises the first plurality of data tracks and the third plurality of data tracks.

3. The data storage system of claim 1 wherein the third head section is positioned between the first head section and the second head section in a direction of travel of the tape.

4. The data storage system of claim 1 further comprising:
   a plurality of data write channels, each data write channel supporting electrical signals representing data to be written onto the tape, the plurality of data write channels divided into a first set of data write channels and a second set of data write channels;
   wherein the first set of data write channels is in communication with the first head section and the third head section; and
   wherein the second set of data write channels in communication with the third head section.

5. The data storage system of claim 1 further comprising a plurality of data read channels, each data read channel supporting electrical signals read from the tape, the plurality of data read channels in communication with the first head section and the third head section.

6. The data storage system of claim 1 further comprising:
   a first positioning actuator operative to move the first head section, the second head section, and the third head section; and
   at least two additional positioning actuators, each additional positioning actuator operative to move one of the first head section, the second head section, and the third head section;

whereby each of the first head section, the second head section, and the third head section is positioned across the tape width separately.

7. The data storage system of claim 6 wherein the first positioning actuator is a coarse positioning actuator and wherein the at least two additional positioning actuators comprises a fine positioning actuator for each of the first head section, the second head section, and the third head section.

8. The data storage system of claim 1 further comprising at least one servo read element on each of the first head section, the second head section, and the third head section, each servo read element operative to read a servo track written onto the tape.

9. The data storage system of claim 1 further comprising a third plurality of read elements on the third head section, each read element in the third plurality of read elements operative to read a data track substantially wider than a data track read by any read element in the first plurality of read elements and the second plurality of read elements.

10. The data storage system of claim 1 wherein the first plurality of data tracks and the second plurality of data tracks are written by the first head section and the third head section if the tape is moving in a first tape direction and the first plurality of data tracks and the second plurality of data tracks are written by the second head section and the third head section if the tape is moving in a second tape direction opposite of the first tape direction.

11. The data storage system of claim 10 wherein the second plurality of read elements is operative to perform a first read-after-write operation on the first plurality of data tracks and the second plurality of data tracks if the tape is moving in the first tape direction and wherein the first plurality of read elements is operative to perform a second read-after-write operation on the first plurality of data tracks and the second plurality of data tracks if the tape is moving in the second tape direction.

12. The data storage system of claim 1 wherein the first plurality of data tracks is interleaved with the second plurality of data tracks.

13. The data storage system of claim 1 further comprising a fourth head section, a fifth head section, and a sixth head section performing the functions of the first head section, the second head section, and the third head section, respectively, the fourth head section, the fifth head section, and the sixth head section operating on a different region of the tape width than the first head section, the second head section, and the third head section.

14. A method of writing a plurality of data tracks across a width of a tape comprising:
   positioning a first head section across the width of tape;
   writing a first subset of the plurality of data tracks onto the tape with a first plurality of write elements on the first head section as the tape is moving past the first head section in a tape direction;
   positioning a second head section across the width of tape, the second head positioning at least partially independent of the first head positioning;
   writing a second subset of the plurality of data tracks onto the tape with a second plurality of write elements on the second head section as the tape is moving past the second head section in the tape direction; the second subset of the plurality of data tracks distinct from the first subset of the plurality of data tracks;
   positioning a third head section across the width of tape, the third head positioning at least partially independent from both the first head positioning and the second head positioning; and
   reading the first subset of the plurality of data tracks and the second subset of the plurality of data tracks with a first plurality of read elements on the third head section to verify that data was correctly written onto the tape.

15. The method of claim 14, wherein the tape direction is a first tape direction, the tape operative to move in a second tape direction opposite of the first tape direction, the method further comprising:
   repositioning the third head section and writing a third subset of the plurality of data tracks onto the tape with a third plurality of write elements on the third head section as the tape is moving past the third head section in the second tape direction;
   repositioning the second head section and writing a fourth subset of the plurality of data tracks onto the tape with the second plurality of write elements on the second head section as the tape is moving past the second head section in the second tape direction; and
   repositioning the first head section and reading the third subset of the plurality of data tracks and the fourth subset of the plurality of data tracks with a second plurality of read elements on the first head section to verify that data was correctly written onto the tape.

16. The method of claim 14 wherein the first subset of the plurality of data tracks is interleaved with the second subset of the plurality of data tracks.

17. The method of claim 14 wherein the second head section is positioned between the first head section and the third head section in the tape direction.

18. The method of claim 14 further comprising:
   determining that an error occurred in writing at least one of the first subset of the plurality of data tracks and the second subset of the plurality of data tracks based on reading the first subset of the plurality of data tracks and the second subset of the plurality of data tracks;
   rewinding at least a portion of the tape;
   if the determined error occurred only in the first subset of the plurality of data tracks, attempting to rewrite only the first subset of the plurality of data tracks; and
   if the determined error occurred only in the second subset of the plurality of data tracks, attempting to rewrite only the second subset of the plurality of data tracks.

19. The method of claim 14 further comprising
   determining that the tape contains wide data tracks, the wide data tracks substantially wider than data tracks written by either the first plurality of write elements or the second plurality of write elements; and
   reading the wide data tracks with a third plurality of read elements on the second head section.

20. A system for writing data tracks across a width of a tape, the data tracks divided into a substantially half set of data tracks positioned amongst a remaining set of data tracks, the system comprising:
   a tape head comprising three parts, each of the three parts positioned across the width of the tape separately from the positions across the width of the tape of the other parts;
   each of two of the three parts comprising write elements for writing the substantially half set of data tracks onto the tape and read elements for reading all the data tracks from the tape, one or the other of these two parts writing the substantially half set of data tracks based on a direction of travel of the tape; and
   the remaining of the three parts comprising write elements for writing the remaining set of the data tracks onto the tape regardless of the direction of travel of the tape.

* * * * *